United States Patent [19]

Bro et al.

[11] 4,233,372
[45] Nov. 11, 1980

[54] HERMETIC SEAL FOR ELECTROCHEMICAL CELL

[75] Inventors: Per Bro, Andover; George Wallis, Lexington, both of Mass.

[73] Assignee: P. R. Mallory & Co. Inc., Indianapolis, Ind.

[21] Appl. No.: 37,556

[22] Filed: May 9, 1979

[51] Int. Cl.³ .......................................... H01M 2/00
[52] U.S. Cl. .................................... 429/174; 429/181; 429/185; 174/50.61
[58] Field of Search ............... 429/174, 185, 181, 171, 429/173, 184; 174/50.61

[56] References Cited

U.S. PATENT DOCUMENTS

| | | | |
|---|---|---|---|
| 3,416,964 | 12/1968 | Michalko | 429/174 |
| 3,421,945 | 1/1969 | Michalko | 429/174 |
| 3,874,929 | 4/1975 | Greatbatch | 429/174 X |
| 4,053,692 | 10/1977 | Dey | 429/171 |
| 4,061,841 | 12/1977 | Sharma et al. | 429/174 X |
| 4,071,663 | 1/1978 | Bredbenner, Jr. | 429/185 X |
| 4,074,026 | 2/1978 | Bones | 429/185 X |
| 4,115,629 | 9/1978 | Dey et al. | 429/174 X |
| 4,148,975 | 4/1979 | Schneider et al. | 429/174 |
| 4,158,721 | 6/1979 | Decker et al. | 429/174 |

Primary Examiner—Anthony Skapars
Attorney, Agent, or Firm—Ronald S. Cornell; Israel Nissenbaum; Martin M. Glazer

[57] ABSTRACT

An hermetic glass-metal seal, for an electrochemical cell, having a metallic central feedthrough as a terminal thereof which is chemically incompatible with the components of said cell. The feedthrough is connected within said cell to a second compatible metallic element for electrical connection to an electrode within said cell. An inert polymeric material is sealed to the glass or outer metal member of the glass-metal seal and is sealed to and encloses the metallic feedthrough within said cell and the connection area between the feedthrough and said second metallic element.

21 Claims, 3 Drawing Figures

HERMETIC SEAL FOR ELECTROCHEMICAL CELL

This invention relates to glass-metal hermetic seals for electrochemical cells and particularly to such seals for non-aqueous electrolyte containing cells.

With the advent of high energy density non-aqueous cells generally utilizing corrosive components such as lithium anodes, sulfur dioxide and thionyl chloride depolarizers and various reactive organic electrolyte solvents, hermeticity of the cell seals has become increasingly important. Of the hermetic seals utilized in non-aqueous electrolyte cells, one of the most reliable seals is the glass-metal seal comprising an outer metal eyelet surrounding a central metal rod or tube and sealed thereto by a glass member. The central metal rod or tube known as the "feedthrough" generally functions as a terminal for the cell with the outer metal eyelet being of opposite polarity with the glass member therebetween providing the necessary electrical insulation.

Commercially available glass-metal seals such as those used in electrical components are generally comprised of steel outer metal eyelets, borosilicate glass sealing members and iron nickel alloy feedthroughs. Such glass-metal seals, while relatively inexpensive, have not generally been used in sealing high energy density non-aqueous electrolyte cells since the components of such cells are chemically reactive with the iron-nickel alloy used as the feedthrough in such seals. Accordingly glass-metal seals for high energy density non-aqueous cells have required the use of metals such as corrosion resistant titanium, tantalum, molybdenum and the like as the feedthrough for such seals. However, the use of such metals has escalated the cost of the cells because of the high cost of such metals and the high cost of working such metals into an acceptable glass-metal seal. As a result, glass-metal seals for non-aqueous cells generally comprise the most expensive part of the cell packaging.

It is an object of the present invention to provide a glass-metal seal structure for electrochemical cells and in particular non-aqueous electrolyte cells wherein commercially available glass-metal seals comprised of metals incompatible with cell components may be effectively utilized therein.

This and other objects, features and advantages of the present invention will become more evident from the following discussion as well as the drawings in which.

Generally the present invention comprises a glass-metal hermetic seal structure on an electrochemical cell with said structure comprising an outer metal eyelet surrounding a central metal member generally in the form of a metal rod or tube and sealed thereto by a glass member. The central metal rod or tube functions as a terminal of the cell with the outer metal eyelet generally being of opposite polarity with the glass member therebetween providing the necessary electrical insulations. The central rod, tube or "feedthrough" is incompatible with the cell components and is connected, within said cell, to a cell-compatible metal member comprised of a material such as aluminum. The cell-compatible metal member provides an electrical connection between an electrode within the cell and the metal feedthrough whereby the feedthrough can function as a terminal for the cell. Substantially all of the portion of the feedthrough, including the area wherein it is attached to the cell-compatible metal member, which is exposed to the cell interior is sealingly enclosed by an inert sealant such as a polyolefin material such as polypropylene or polyethylene or adherent polymeric halogenated hydrocarbons such as copolymers of ethylene and chlorotrifluoroethylene ("HALAR"). As part of the enclosure the sealant is also preferably sealed to the glass of the glass-metal seal or to the outer metal eyelet of the seal.

Figure 1:
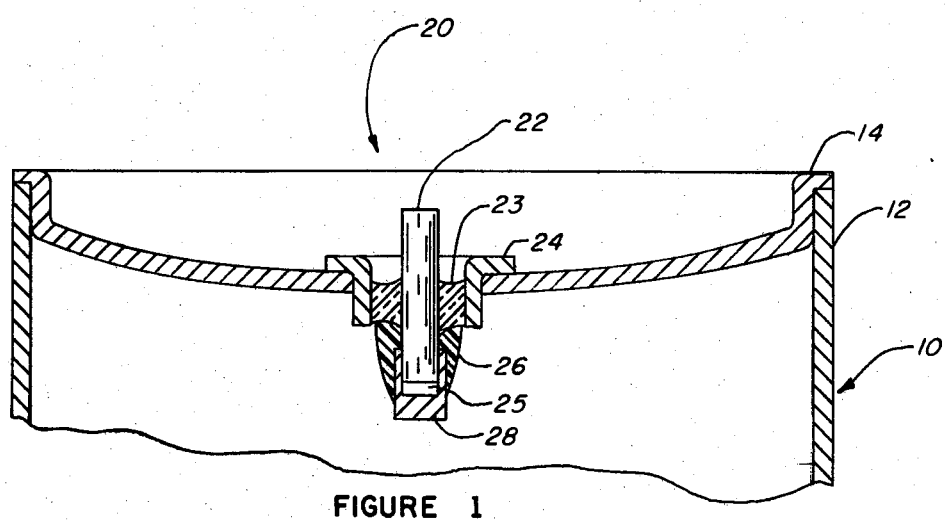
FIG. 1 is a sectioned view of an embodiment of the glass-metal seal of the present invention as positioned on a cell.

With specific reference to the drawings, FIG. 1 shows the glass-metal seal structure 20 of the present invention positioned within a circular aperture in the top 14 of electrochemical cell 10. The container for cell 10 comprises cup shaped member 12 with cell top 14 peripherally welded thereto. Glass-metal seal structure 20 is welded to the periphery of the aperture in top 14 to thereby hermetically enclose and seal the cell.

The glass-metal seal structure 20 is comprised of outer metal eyelet 24, with a flange portion thereof overlapping the periphery of the aperture in cell top 14 and being welded thereto. The glass-metal seal structure further includes metal rod or feedthrough 22 concentrically positioned within eyelet 24. Glass member 23 is sealed to metal eyelet 24 and metal rod 22 in a common commercially available configuration, thereby holding rod or feedthrough 22 in position, electrically insulating rod 22 from eyelet 24 and hermetically sealing the contained cell. Feedthrough 22 extends below the lower surface of glass member 23 into the interior of the cell 10 for electrical connection with a cell electrode (not shown) wherein it would normally be subject to corrosive contact with the cell components. To prevent such eventual corrosion and possible seal failure the lower end of feedthrough 22 is capped by metal member 28 which metal member is comprised of a metal substantially inert to the cell components. Aperture 25 within metal member or cap 28 is sized to accommodate the end of metal feedthrough 22 in a swaged fit whereby a positive mechanical and electrical connection is achieved. In order to completely insulate feedthrough 22 from the corrosive components of the cell, inert sealant material 26 surrounds and is sealed to exposed surfaces of feedthrough 22. Sealant material 26 additionally is sealed to the lower surface of glass members 23 which encloses feedthrough 22 and the sealant material 26 overlaps the connection area between feedthrough 22 and cap 28 and is sealed to a portion of said cap to insure substantially complete sealing and isolation of feedthrough 22 from the cell components. Sealant material 26 does not however completely enclose metal cap 28 since polymeric materials generally used as the sealant materials are generally insulative and metal cap 28 is electrically connected (though not shown) to an electrode within the cell whereby feedthrough 22, electrically connected to cap 28, functions as a terminal for cell 10. Sealant material 26 should be substantially inert to the corrosive materials within said cell and additionally should be sufficiently resilient to compensate for difference in expansion or contraction of metal cap 28, feedthrough 22 and glass member 23. Examples of such substantially inert materials include polyolefins such as the aforementioned polyethylene and polypropylene and polymeric halogenated hydrocarbons.

Suitable polymeric halogenated hydrocarbons capable of being used in accordance with this invention are those with repeating units having the formula:

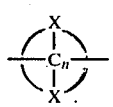

wherein n is a whole number equal to or greater than 2 and wherein X represents substituents, a predominant portion of which, within each repeating unit, are fluorine and at least one which in each repeating unit is a substituent other than fluorine. By "predominant portion" it is meant that at least fifty percent of the substituents are fluorine when only one other type of substituent is present, and that, in other cases, there is an excess of fluorine over any other substituent present. These polyhalogenated hydrocarbons are generally inert to corrosive electrochemical cell components and have adherent properties.

Preferably those substituents in the repeating units which are not fluorine are selected from the group consisting of chlorine, bromine, hydrogen, $-RY_m$, $-ORY_m$, and mixtures thereof, wherein Y represents halogen or hydrogen or a mixture thereof, R is a chain having 1–6 carbon atoms, and m represents the requisite number of hydrogen and or halogen atoms necessary to complete the chain. Suitable polymeric polyhalogenated hydrocarbons for use in the present invention include copolymers of fluorinated ethylene and propylene, one such copolymer being sold under the trademark Teflon FEP by E. I. DuPont de Nemours and Co., Wilmington, Del.; copolymers of ethylene and tetrafluoroethylene sold under the trademark of TEFZEL by E. I. DuPont de Nemours and Co.; chlorotrifluoroethylene resins such as "KEL-F" available from 3M Co. or "Plaskon" sold by Allied Chemical Corp.; the copolymers of ethylene and chlorotrifluoroethylene one of which is sold under the trademark of HALAR by Allied Chemical Corporation, Morristown, N.J.; polymers having a fluorocarbon backbone and a perfluoro alkoxy side chain, one of which is sold under the trademark of TEFLON PFA by E. I. DuPont de Nemours and Co.; and homopolymers of vinylidene fluoride, one such polymer being marketed as "KYNAR" by Pennwalt Corp., Philadelphia, Pa.

Polymeric polyhalogenated hydrocarbons other than those cited above, such as polytetrafluoroethylene, cannot be used in the present invention since they will not flow well when heated since they have a very high melt viscosity and will not adhere properly, if at all, to the metal and glass surfaces.

Figure 2:
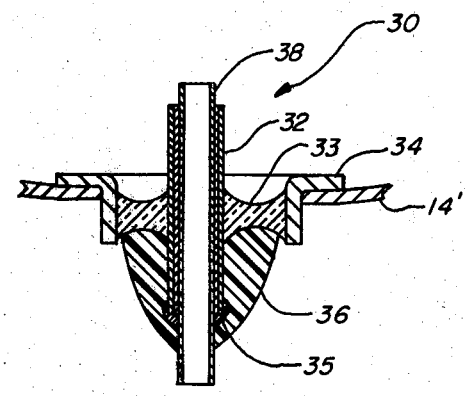
FIG. 2 is a sectioned view of a second embodiment of the glass-metal seal of the present invention.

Should it be desirable that the metal feedthrough of the glass-metal seal be tubular in shape in order to allow for introduction of fluid electrolyte within the cell, the configuration of the glass-metal seal shown in FIG. 2 may be utilized. In place of the metal rod 22 in FIG. 1 the feedthrough in FIG. 2 is tubular metal member 32. A second tubular cell compatible member 38 of smaller diameter than that of tubular member 32 is inserted within member 32 and extends below the bottom said member 32 within the interior of the cell. The two tubular members 32 and 38 are mechanically and electrically sealed together by brazing material 35 such as a copper-zinc alloy. Inert sealant material 36 encloses and is sealed to the exposed surfaces of member 32. Sealant material 36 is further sealed to glass member 33, of the glass-metal seal structure 30, and said sealant material 36 overlaps the brazed juncture between members 32 and 38 and is also sealed to a portion of the exposed surface of member 38.

Figure 3:
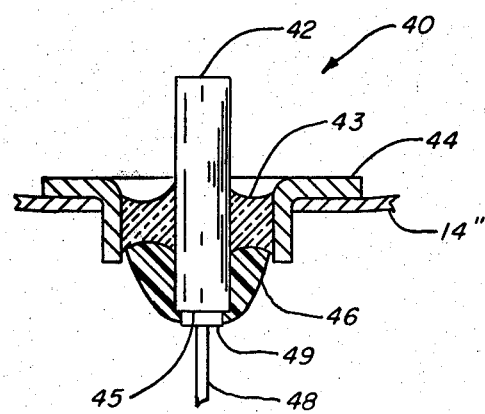
FIG. 3 is a sectioned view of a third embodiment of the glass-metal seal of the present invention.

FIG. 3 shows a third embodiment of the glass-metal seal structure wherein in place of the swage connection in FIG. 1 and the brazed connection in FIG. 2, cell compatible pin 48 with flat head 49 is welded to the bottom of rod or feedthrough 42 to provide both mechanical and electrical connection. Pin 48 is thereafter imbedded within an electrode of the cell to complete the electrical connection whereby feedthrough 42 functions as a cell terminal. Sealant material 46 overlaps the welded area between feedthrough 42 and pinhead 49 and is sealed either to the pinhead 49 as shown, or the pin 48 and, as in FIGS. 1 and 2, is sealed to the exposed areas of the feed-through 42 and the glass member 43 of the glass-metal seal 40.

Commercially available glass-metal seals in the form of metal eyelets with metal feedthroughs and a glass seal therebetween generally are comprised of a steel eyelet, which is generally compatible with corrosive cell components, when kept a negative potential, and a glass such as borosilicate glass having major proportions thereof of silicon dioxide and boron oxide and which has a coefficient of expansion suitably corresponding to that of both the metal of the metal eyelet and the metal of the feedthrough to provide either a compression or a matched expansion seal as desired. However, as mentioned above, in commercially available glass-metal seals the central feedthrough is generally comprised of an iron-nickel alloy such as alloy 52, which is incompatible with electrochemical cell components. Should the polarity of the cell be altered whereby the steel outer metal eyelet may become subject to corrosion as well, the sealant material may be extended to cover such outer metal eyelet as well. In such configuration the sealant material is sealed to the cell top peripherally surrounding said eyelet. Alternatively if only the outer metal eyelet is incompatible, the container itself functions as the cell-compatible connection to the electrode. The sealing material in such embodiment sealingly encloses the outer metal eyelet and preferably the adjacent glass and cell container.

The most preferred metal for the metal member utilized in the present invention which is attached to the cell-incompatible metal to provide electrical connection between the feedthrough or eyelet and an electrode of the cell and which is resistant to degradation by cell components is aluminum because of its low cost. However other metals such as tantalum, titanium, molybdenum, tungsten and the like which are generally considered non-corrodible metals may be used as the metal member attached to the glass-metal seal feedthrough or eyelet for electrical connection of the feedthrough or eyelet to an electrode of the cell.

The application and sealing of the sealant material to the metal and glass surfaces can be effected by various methods including application of the material such as polyethylene or polypropylene as a preform or as a suspension of powdered polyethylene or polypropylene in a solvent such as xylene. After the application of the sealant material to the metal and glass surfaces the material is heated for a short period of time to effect a bond with such surfaces. For polyethylene or polypropylene a heat treatment at about 150° C. for about 30 minutes is sufficient for such bonding. Other application and sealing procedures particularly useful with polymeric fluorocarbon sealants as above described are those set forth in U.S. Pat. No. 4,110,518 assigned to the same assignee as the present invention which disclosure is incorporated herein by reference thereto.

It is understood that the embodiments shown in FIGS. 1–3 are exemplary of the present invention and that changes in structure and materials may be made without departing from the scope of the present invention as defined in the following claims.

What is claimed is:

1. An electrochemical cell comprising a container closed with an hermetic seal, said seal comprising a first metal member separated from a second metal member and sealed thereto by a glass member, said first and second metal members being electrically insulated from each other by said glass member, characterized in that said second metal member is chemically incompatible with components of said cell, and said second metal member is mechanically and electrically connected to a third metal member, chemically compatible with components of said cell, and exposed thereto, said third metal member being electrically connected to an electrode of said cell to provide electrical continuity between said electrode and said second metal member and said seal further including means for sealingly enclosing substantially all of the surfaces of said second metal member which are exposed within said cell container.

2. The cell of claim 1 wherein said first metal member has an eyelet configuration.

3. The cell of claim 2 wherein said second metal member comprises a metal rod concentrically positioned within said eyelet.

4. The cell of claim 1 wherein said second metal member has an eyelet configuration and said third metal member comprises a portion of said cell container.

5. The cell of claim 4 wherein said first metal member comprises a metal rod concentrically positioned within said eyelet.

6. An electrochemical cell comprising a container closed with an hermetic seal, said seal comprising a first metal member separated from a second metal member and sealed thereto by a glass member, said first and second metal members being electrically insulated from each other by said glass member, characterized in that said second metal member is mechanically and electrically connected to a third metal member, chemically compatible with components of said cell, said third metal member being electrically connected to an electrode of said cell to provide electrical continuity between said electrode and said second metal member and said seal further including means for sealingly enclosing substantially all of the surfaces of said second metal member which are exposed within said cell container, with said first metal member having an eyelet configuration and said second metal member comprising a metal rod concentrically positioned within said eyelet, and wherein said third metal member comprises a metal cap for the end of said metal rod.

7. The cell of claim 6 wherein said metal cap and metal rod are connected by a swaged connection to provide said electrical and mechanical connection.

8. The cell of claim 3 wherein said third metal member comprises a nail.

9. The cell of claim 8 wherein said nail is welded to an end of said metal rod.

10. An electrochemical cell comprising a container closed with an hermetic seal, said seal comprising a first metal member separated from a second metal member and sealed thereto by a glass member, said first and second metal members being electrically insulated from each other by said glass member, characterized in that said second metal member is mechanically and electrically connected to a third metal member, chemically compatible with components of said cell, said third metal member being electrically connected to an electrode of said cell to provide electrical continuity between said electrode and said second metal member and said seal further including means for sealingly enclosing substantially all of the surfaces of said second metal member which are exposed within said cell container, and wherein said second metal member comprises a tube and wherein said third metal member fits within said tube and is mechanically and electrically connected to the interior of said tube.

11. The cell of claim 10 wherein said third metal member comprises a tube having a smaller diameter than the diameter of said second metal member tube.

12. The cell of claim 11 wherein said second and third metal members are brazed to each other to effect said mechanical and electrical connection.

13. The cell of claim 1 wherein said sealing means comprises a sealant material selected from the group consisting of polyolefins and polymeric halogenated hydrocarbons.

14. The cell of claim 13 wherein said sealing material is selected from the group consisting of polyethylene, polypropylene and copolymers of ethylene and chlorotrifluoroethylene.

15. The cell of claim 1 wherein said sealing means further sealingly encloses the connection between said second and third metal members.

16. The cell of claim 15 wherein said sealing means further sealingly encloses a portion of said glass member adjacent said second metal member.

17. The cell of claim 1 wherein said cell contains a lithium anode.

18. The cell of claim 17 wherein said cell contains a depolarizer selected from the group consisting of sulfur dioxide and thionyl chloride.

19. The cell of claim 18 wherein said third metal member is comprised of a metal of the group consisting of aluminum, tantalum, titanium, molybdenum and tungsten.

20. An hermetic seal for use in an electrochemical cell comprising a metal eyelet, a metal rod concentrically positioned within said eyelet and sealed thereto by a glass member, said metal rod being chemically incompatible with components of said cell and being mechanically and electrically connected to a metal member, chemically compatible with components of said cell and exposed thereto, said seal further including sealing means for sealingly enclosing substantially all of said metal rod between said glass member and the connection of said rod to said metal member.

21. The seal of claim 20, wherein said sealing means is comprised of a sealant material selected from the group consisting of polyethylene, polypropylene and copolymers of ethylene and chlorotrifluoroethylene.

* * * * *